US006938964B2

(12) United States Patent
Flood et al.

(10) Patent No.: US 6,938,964 B2
(45) Date of Patent: Sep. 6, 2005

(54) WHEEL

(75) Inventors: Nicholas Flood, County Westmeath (IE); Patrick Beirne, County Westmeath (IE); Thomas Mullen, County Meath (IE)

(73) Assignee: Menza Limited, County Westmeath (IE)

( * ) Notice: Subject to any disclaimer, the term of this patent is extended or adjusted under 35 U.S.C. 154(b) by 0 days.

(21) Appl. No.: 10/216,571

(22) Filed: Aug. 12, 2002

(65) Prior Publication Data

US 2003/0117009 A1 Jun. 26, 2003

Related U.S. Application Data

(60) Provisional application No. 60/341,306, filed on Dec. 20, 2001.

(51) Int. Cl.$^7$ ............................ B60B 23/00; B60B 27/06
(52) U.S. Cl. .................................. 301/119; 301/111.07
(58) Field of Search ........................ 301/111.01, 111.03, 301/112, 119, 121, 122, 111.04, 111.07

(56) References Cited

U.S. PATENT DOCUMENTS

| | | | | |
|---|---|---|---|---|
| 745,989 A | * | 12/1903 | Ayres | 301/119 |
| 760,169 A | * | 5/1904 | Abbott | 301/119 |
| 4,358,162 A | | 11/1982 | Schneider et al. | 301/63 |
| 4,544,425 A | | 10/1985 | Provolo | 156/73 |
| 4,641,878 A | | 2/1987 | Petersson | 295/49 |
| 5,314,241 A | * | 5/1994 | Cheng | 301/111.06 |
| 5,368,371 A | | 11/1994 | Markling | 301/64 |
| 5,408,854 A | | 4/1995 | Chiu | 70/225 |
| 5,529,385 A | * | 6/1996 | Tsao | 301/111.06 |
| 5,884,982 A | * | 3/1999 | Yemini | 301/111.03 |
| 5,902,018 A | * | 5/1999 | Owen et al. | 301/111.04 |
| 6,056,369 A | * | 5/2000 | Lin | 301/111.06 |
| 6,099,083 A | * | 8/2000 | Logan | 301/111.01 |
| 6,170,920 B1 | | 1/2001 | Markling | 301/111 |
| 6,234,582 B1 | * | 5/2001 | Wu | 301/111.06 |
| 6,273,520 B1 | * | 8/2001 | Liao | 301/111.06 |
| 6,280,001 B1 | * | 8/2001 | Parker et al. | 301/112 |
| 6,361,121 B1 | | 3/2002 | Morris | 301/112 |
| 6,375,274 B1 | | 4/2002 | Morris | 301/111 |
| 6,464,305 B2 | * | 10/2002 | Markling | 301/111 |
| 6,520,597 B1 | * | 2/2003 | Markling | 301/64 |
| 6,523,910 B1 | * | 2/2003 | Lin | 301/111.06 |
| 6,637,835 B2 | | 10/2003 | Morris | |
| 6,722,744 B1 | * | 4/2004 | Shieh | 301/119 |
| 2003/0085611 A1 | * | 5/2003 | Markling | |

FOREIGN PATENT DOCUMENTS

| | | |
|---|---|---|
| EP | 0083451 B1 | 7/1983 |
| EP | 0359947 B1 | 3/1990 |
| EP | 0508902 A1 | 10/1992 |

* cited by examiner

*Primary Examiner*—Russell D. Stormer
*Assistant Examiner*—Jason R. Bellinger
(74) *Attorney, Agent, or Firm*—Jacobson Holman PLLC

(57) ABSTRACT

A journal for coupling a wheel to an axle is configured to be mounted in a bore of the wheel. The journal defines a reception space for receiving an axle. A locking element is pivotally mounted on the journal from a release position in which the axle is removable from the reception space and secured position in which a tooth of the locking element is engaged with a groove in the axle. When the tooth of the locking element is engaged in the groove withdrawal of the axle is prevented.

45 Claims, 9 Drawing Sheets

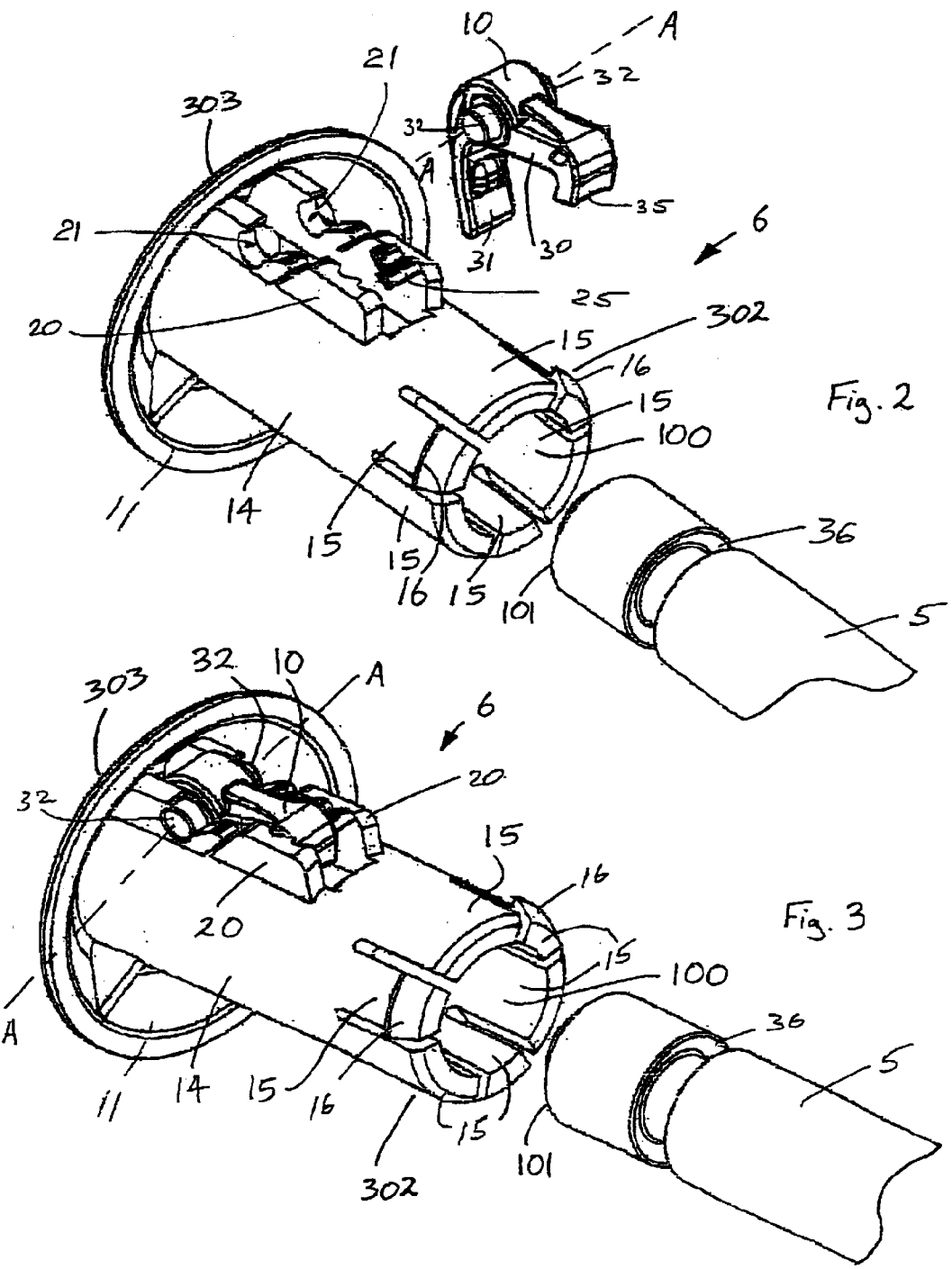

WHEEL

This is a complete application claiming benefit of provisional 60/341,306 filed Dec. 20, 2001.

INTRODUCTION

The invention relates to an assembly for coupling a wheel to an axle, and in particular to a blow moulded plastic wheel for use with a roll-out refuse bin of the type used for street-side refuse collections. Such refuse bins are commonly referred to as "wheelie bins" or "trash carts".

Because of the heavy duty required of such bins it is essential that the bin wheels are securely coupled to an axle. Various attempts have been made to provide retaining systems for coupling a bin wheel to an axle. Known systems however are of complex or bulky construction, often requiring several parts and involving complex assembly.

This invention is therefore directed towards providing a relatively simple blow moulded wheel which can be easily assembled and securely coupled to an axle.

STATEMENTS OF INVENTION

According to the invention, there is provided a journal for coupling a wheel to an axle. The journal is configured to be mounted in a bore of a wheel. The journal defines a reception space for receiving an axle. The reception space defines an insertion end through which an axle may enter the reception space. The journal comprises a locking element. The locking element defines a pivot axis and a securement region. The locking element is pivotable about the pivot axis between a release position in which an axle is removable from the reception space and a secured position in which the locking element is secured to an axle at the securement region to secure the axle in position in the reception space.

In one embodiment of the invention the pivot axis is located on the opposite side of the securement region to the insertion end.

In a preferred case the locking element comprises a first arm engagable with an axle upon advancement of the axle through the reception space to pivot the locking element from the secured position to the release position. Ideally the first arm is locatable in the secured position in a recess of an axle to secure the axle in position in the reception space. Most preferably the first arm is shaped to resist pivoting of the locking element from the secured position to the release position upon retraction of an axle through the reception space. The first arm may comprise a pawl.

In another embodiment the locking element comprises a second arm engagable with an axle upon advancement of the axle through the reception space to pivot the locking element from the release position to the secured position. Preferably the pivot axis is located at the junction of the first arm and the second arm. Ideally the first arm is substantially perpendicular to the second arm.

The journal may comprise means to lock the locking element in the secured position. Preferably the locking means comprises a latch. Ideally the latch comprises a latch arm movable between a release position in which the locking element is movable and a locking position in which the locking element is locked in the secured position. Most preferably the latch arm is biased towards the locking position. In the locking position the latch arm may engage the locking element. Preferably one or more tooth formations are provided on the locking element against which the latch arm engages in the locking position.

In a preferred embodiment the journal comprises a main body portion, the locking element being separate from the main body portion. Ideally the locking element is mounted to the main body portion. Most preferably the locking element comprises a pivot extension for location in a co-operating pivot receiver of the main body portion. The locking element may comprise a pair of oppositely directed pivot extensions for location in a pair of co-operating pivot receivers of the main body portion. Preferably the pivot extension is locatable in the pivot receiver in a snap-fit manner.

In a further embodiment the journal comprises means to secure the journal in position in a bore of a wheel. Preferably the securing means comprises a lip engagable with a shoulder defined on a wheel. The lip may be engagable with a shoulder defined by an open mouth of a bore. The lip may be engagable with a shoulder defined within a bore. Ideally the lip is engagable with a shoulder which extends circumferentially around a bore. Most preferably the journal comprises a lip at each end of the journal. The lip may be movable between a release position in which the journal is removable from a bore and a secured position in which the journal is secured in position in the bore. Ideally the lip is biased towards the secured position. Most preferably the lip is provided in the form of at least one protrusion at an end of at least one cantilever arm. A plurality of protrusions may be provided spaced around the circumference of the journal.

In a preferred case the journal comprises an accessway through which access may be gained to one or more movable parts of the journal.

The pivot axis may be substantially perpendicular to a longitudinal axis of the reception space.

In another aspect, the invention provides a journal for coupling a wheel to an axle. The journal is configured to be mounted in a bore of a wheel. The journal has a reception space for receiving an axle; and the journal comprises a main body portion and a separate locking element. The locking element is pivotable relative to the main body portion between a release position in which an axle is removable from the reception space and a secured position in which an axle is secured in position in the reception space.

The invention also provides in another aspect a wheel assembly comprising a wheel, and a journal for coupling the wheel to an axle. The journal is configured to be mounted in a bore of the wheel. The journal defines a reception space for receiving an axle. The reception space defines an insertion end through which an axle may enter the reception space. The journal comprises a locking element. The locking element defines a pivot axis and a securement region. The locking element is pivotable about the pivot axis between a release position in which an axle is removable from the reception space and a secured position in which the locking element is secured to an axle at the securement region to secure the axle in position in the reception space.

In one embodiment the wheel has an outer rim and an inner hub with a central bore. Preferably the wheel is of moulded plastic.

According to another aspect of the invention there is provided a wheel having an outer rim and an inner hub with a central bore, the wheel defining an engagement surface in the bore, the engagement surface extending circumferentially around the bore for engagement with at least part of a journal to secure the journal in the bore.

The engagement surface may be provided by a radially inwardly protruding shoulder.

In another aspect the invention provides a wheel having an outer rim and an inner hub with a central bore, the wheel defining a recess stepped back from the bore for accommodating means to secure an axle in position in the bore, the recess extending around only a portion of the circumference of the bore.

In a further aspect, the invention provides an axle assembly comprising a axle, and a journal for coupling the axle to a wheel. The journal is configured to be mounted in a bore of a wheel. The reception space defines an insertion end through which the axle may enter the reception space. The journal comprises a locking element. The locking element defines a pivot axis and a securement region. The locking element is pivotable about the pivot axis between a release position in which the axle is removable from the reception space and a secured position in which the locking element is secured to the axle at the securement region to secure the axle in position in the reception space.

In one embodiment the axle comprises a recess for receiving the locking element in the secured position. Preferably the recess comprises a groove in an outer surface of the axle. Ideally the groove extends radially inwardly of the outer surface. The groove may extend circumferentially around the axle. Most preferably a leading end of the axle has a chamfered edge.

According to a further aspect, the invention provides an assembly of a wheel an axle, and a journal for coupling the wheel to the axle. The journal is configured to be mounted in a bore of the wheel. The journal defines a reception space for receiving the axle. The reception space defines an insertion end through which the axle may enter the reception space. The journal comprises a locking element. The locking element defines a pivot axis and a securement region. The locking element is pivotable about the pivot axis between a release position in which the axle is removable from the reception space and a secured position in which the locking element is secured to the axle at the securement region to secure the axle in position in the reception space.

The invention also provides in another aspect a bin or trash cart comprising an assembly of a wheel, an axle, and a journal for coupling the wheel to the axle. The journal is configured to be mounted in a bore of the wheel. The journal defines a reception space for receiving the axle. The reception space defines an insertion end through which the axle may enter the reception space. The journal comprises a locking element. The locking element defines a pivot axis and securement region. The locking element being is pivotable about the pivot axis between a release position in which the axle is removable from the reception space and a secured position in which the locking element is secured to the axle at the securement region to secure the axle in position in the reception space.

BRIEF DESCRIPTION OF THE DRAWINGS

The invention will be more clearly understood from the following description of some embodiments thereof, given by way of example only, with reference to the accompanying drawings, in which:—

FIG. 2 is an exploded, perspective view of a journal according to the invention;

FIG. 3 is an assembled, perspective view of the journal of FIG. 2;

DETAILED DESCRIPTION

Figure 1:
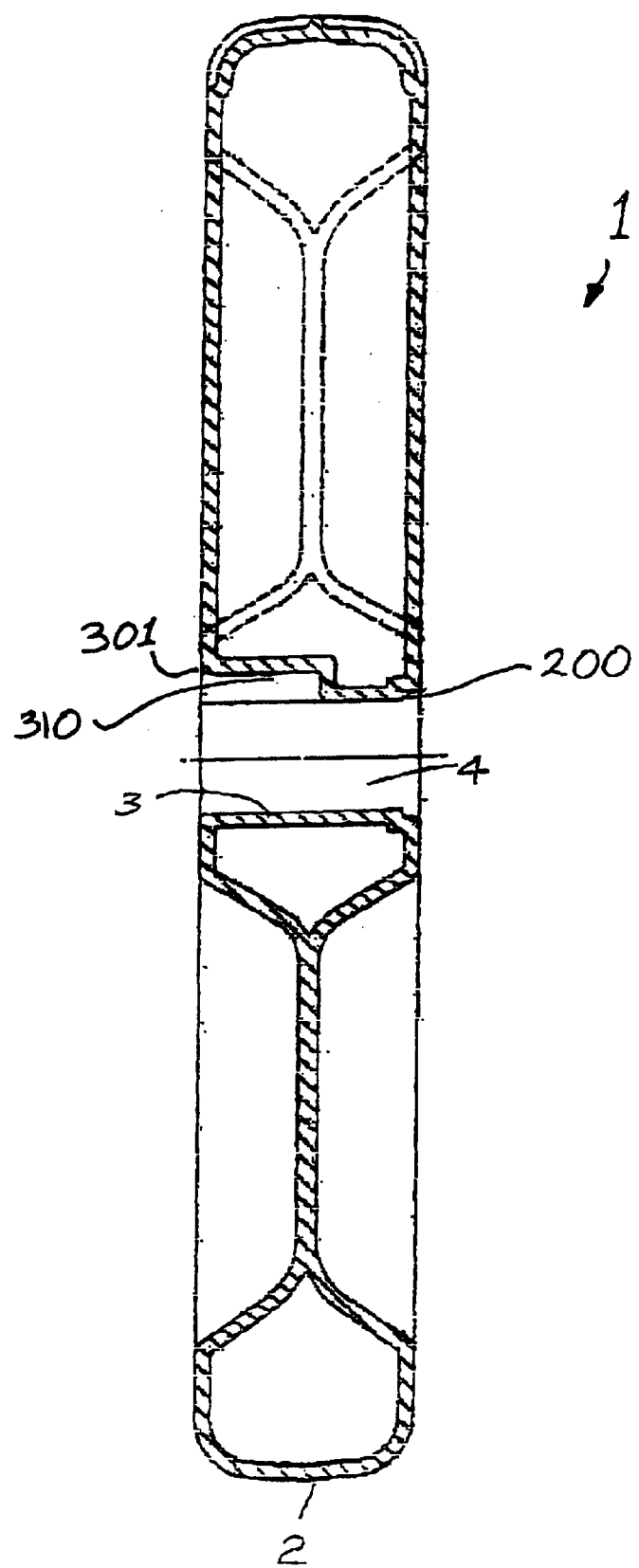
FIG. 1 is a cross-sectional, side view of a wheel.

Referring to the drawings and initially to FIGS. 1 to 8 thereof, there is illustrated a journal 6 according to the invention which is suitable for coupling a wheel to an axle. In use the journal 6 is mounted in a bore of a wheel, and the journal 6 has a reception space 100 for receiving an axle.

In this case the wheel 1 is a blow moulded plastic wheel having an outer threaded rim 2 and an inner hub 3 (FIG. 1). A central bore 4 is provided through the hub 3 with a radially inwardly protruding shoulder formation 200 defined in the bore 4 towards an inner end of the hub 3. The shoulder 200 extends circumferentially around the bore 4. A recess 310 is provided in the wheel 1 stepped back from the bore 4, the recess 310 being provided along only portion of the circumference of the bore 4.

Figure 7:
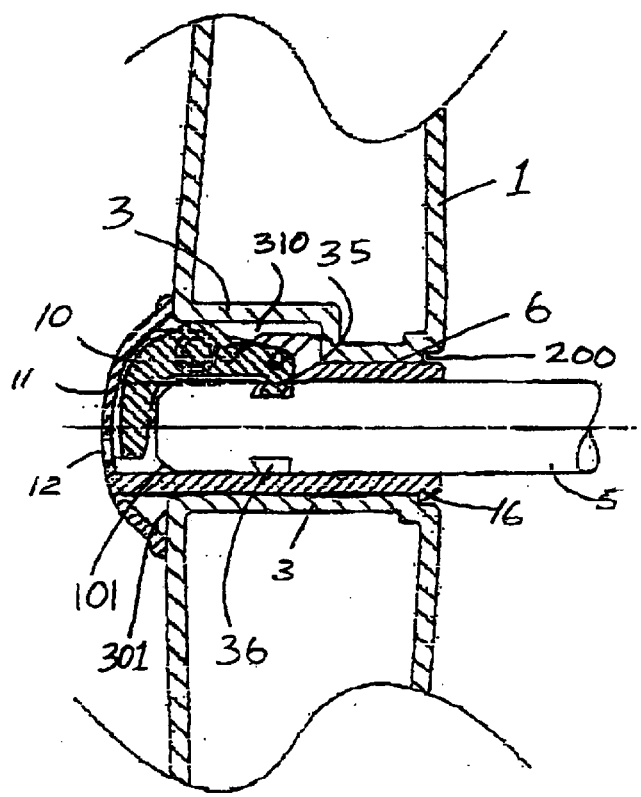
FIG. 7 is a cross-sectional, side view of the journal and axle of FIG. 6 coupled to a wheel.

The axle 5 has a groove 36 extending radially inwardly of an outer surface of the axle 5, and extending circumferentially around the axle 5 (FIG. 7). The leading end of the axle 5 has a chamfered edge 101.

The journal 6 comprises a tubular main body portion 14, and a locking element 10 which is provided as a separate component pivotally mounted to the main body portion 14, as illustrated in FIGS. 2 and 3.

The main body portion 14 comprises an outer cap 11 at an outermost end 303, and is divided into axially extending cantilever arm segments 15 at an insertion end 302. In this case there are six arm segments 15. The arms 15 are movable in a cantilever manner between a release position in which the journal 6 may be moved into and out of the bore 4 of the wheel 1, and a secured position in which the journal 6 is secured in position in the bore 4.

Radially outwardly protruding lips 16 are formed at the insertion end 302 of alternate arms 15 (FIGS. 2 and 3) for engagement with the annular shoulder 200 of the bore 4. The lips 16 have chamfered edges.

Figure 8:
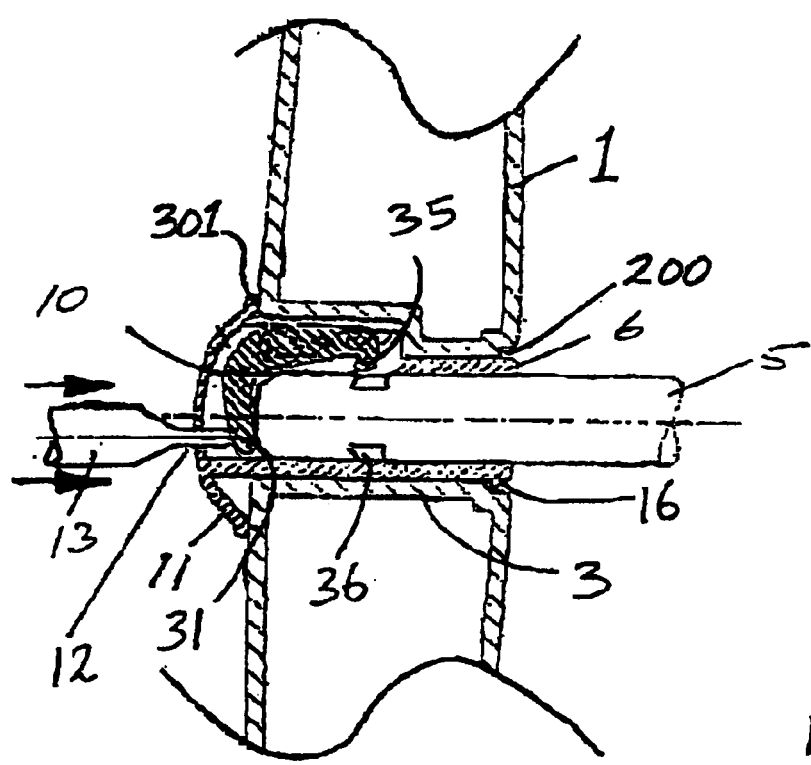
FIG. 8 is a cross-sectional, side view illustrating decoupling of the axle from the journal of FIG. 7.

An accessway 12 is defined through the outer cap 11 to facilitate access to movable parts of the journal 6, such as the locking element 10, through the cap 11, for example with a tool such as a screwdriver, as illustrated in FIG. 8. The accessway 12 is normally covered with a thin layer of plastic to prevent ingress of dirt into the journal 6.

Two axially extending, outwardly projecting ridges 20 are provided on the main body portion 14 extending from the cap 11 along part of the main body portion 14 to reinforce the journal 6. A pivot receiving cradle 21 is formed in each ridge 20.

The reception space 100 is closed off at the outermost end 303 by the cap 11, and is open at the insertion end 302 to facilitate insertion of the axle 5 into the reception space 100.

Figure 4:
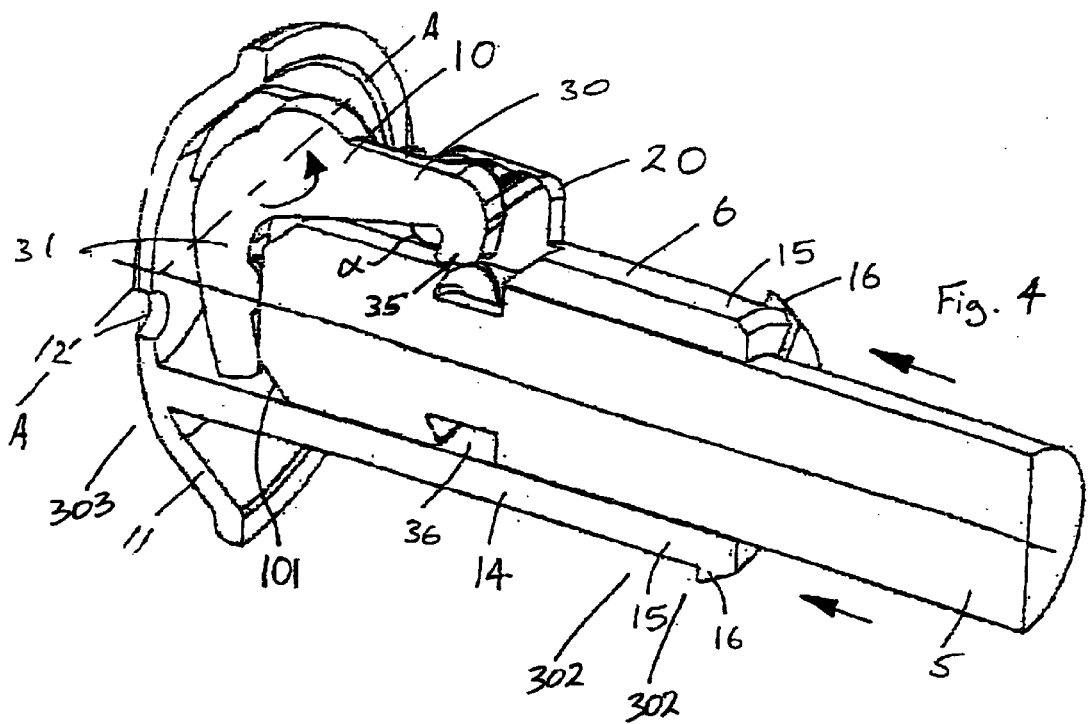
FIGS. 4 and 5 are cut-away perspective views illustrating coupling of an axle to the journal FIG. 3.
Figure 5:
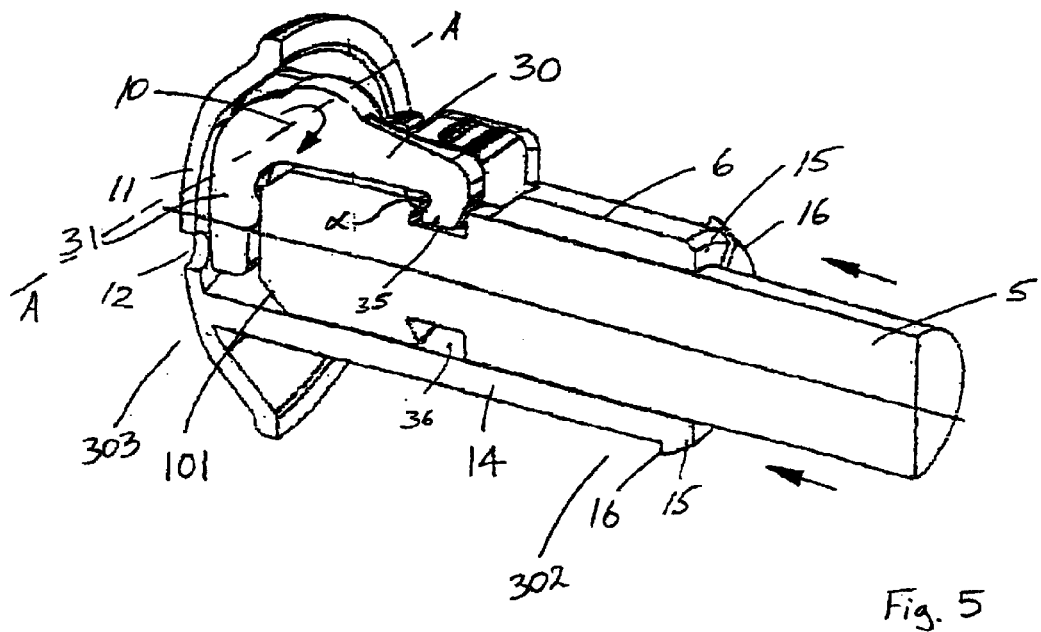

The locking element 10 is an "L"-shaped pawl, and comprises a first arm 30 integrally formed with a substantially perpendicular second arm 31. A tooth 35 depends downwardly from the free end of the first arm 30. As illustrated in FIGS. 4 and 5, the angle α defined between the tooth 35 and the first arm 30 is less than 90□.

A pivot axis A—A passes through the locking element 10 at the junction of the first arm 30 and the second arm 31 and a pair of oppositely directed pivot extensions 32 are formed extending outwardly from the locking element 10 along the pivot axis A—A.

A suitable material for the locking element 10 is a metallic material or a plastics material.

The journal 6 is assembled by mounting the locking element 10 to the main body portion 14 by locating the pivot extensions 32 into the co-operating pivot cradles 21 in a snap-fit manner (FIG. 3).

When assembled, the locking element 10 is pivotable about the pivot axis A—A between a release position (FIG. 4), and a secured position (FIG. 5). With the locking element 10 in the release position, the axle 5 is movable into and out of the reception space 100 defined by the tubular main body portion 14. With the locking element 10 in the secured position, the tooth 35 of the first arm 30 is engaged with the axle groove 36 to secure the axle 5 in position in the reception space 100 (FIGS. 5 and 7).

The region in which the tooth 35 of the first arm 30 engages within the groove 36 is referred to in this specification as the securement region.

The locking element 10 is typically injection moulded from a plastics material, and the weight distribution of the locking element 10 biases the tooth 35 towards engagement with the axle groove 36.

The journal 6 is coupled to the wheel 1 by inserting the arms 15 into the bore 4 of the wheel 1 from the front or cap side. As the arms 15 enter the bore 4, the arms 15 are pivoted inwardly to the release position by a camming engagement of the chamfered lips 16 with the internal wall of the bore 4.

When the lips 16 reach the shoulder 200, the lips 16 move outwardly to the secured position under the biasing action of the cantilever arms 15 to engage behind the annular shoulder 200. The cap 11 engages with the shoulder 301 defined by the open mouth of the bore 4 at the outer end of the hub 3. In this manner the journal 6 is secured in position in the bore 4.

As illustrated in FIG. 7, the recess 310 in the wheel 1 accommodates the locking element 10 and the upstanding ridges 20 on the main body portion 14 when the journal 6 is secured in position in the bore 4.

By engaging the lips 16 with the annular shoulder 200 at three points spaced around the circumference of the shoulder 200, this arrangement provides for a particularly secure coupling of the journal 6 to the wheel 1.

To couple the axle 5 to the journal 6, the leading end 101 of the axle 5 is inserted into the reception space 100 of the main body portion 14, and the axle 5 is advanced. As the leading end 101 passes the tooth 35, the locking element 10 is pivoted from the secured position to the release position by a camming engagement of the chamfered leading end 101 of the axle 5 with the tooth 35 (FIG. 4).

Figure 6:
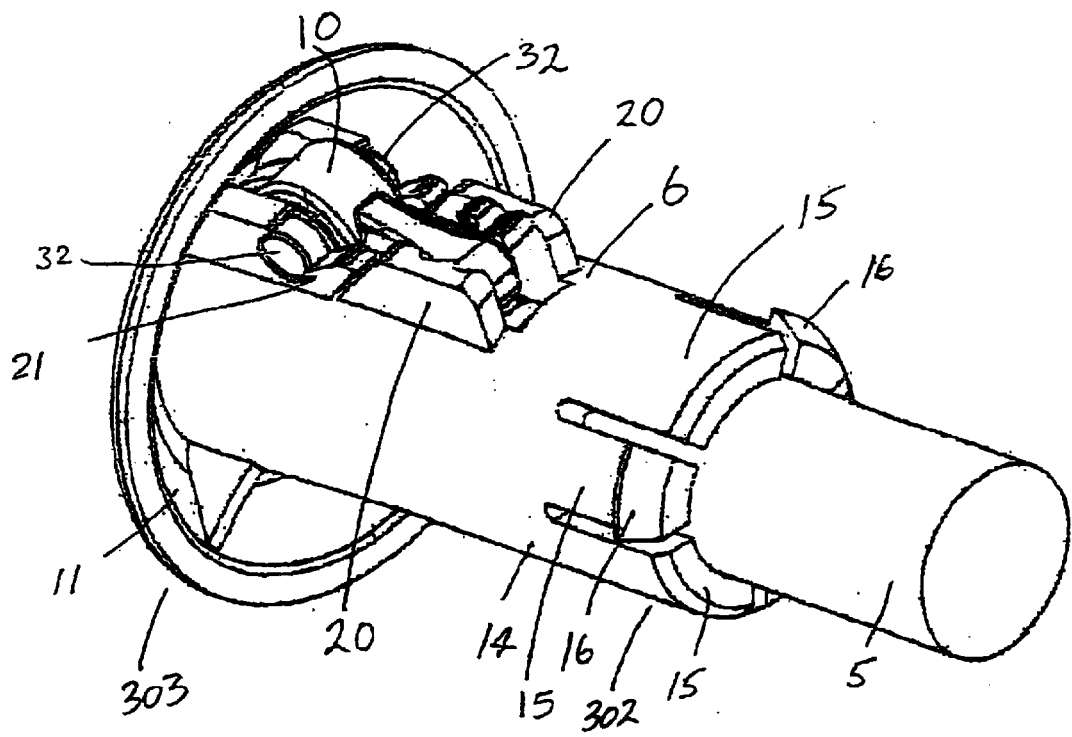
FIG. 6 is a perspective view of the axle and journal of FIGS. 4 and 5.

When the leading end 101 of the axle 5 reaches the second arm 31 of the locking element 10, the axle groove 36 is aligned with the tooth 35. Further advancement of the axle 5 through the reception space 100 causes the leading end 101 to press against the second arm 31 of the locking element 10 and thereby pivot the locking element 10 from the release position to the secured position moving the tooth 35 downwardly into the groove 36 (FIG. 5). The axle 5 is thus secured in position within the reception space 100 of the journal 6, as illustrated in FIGS. 6 and 7.

As illustrated in FIGS. 2 to 5, the pivot axis A—A is located on one side of the securement region, in which the tooth 35 of the first arm 30 is engaged within the groove 36, and the insertion end 302 of the reception space 100 is located on the opposite side of the securement region.

In the journal 6 of the invention the axle 5 may be secured in position within the reception space 100 by a simple advancement of the axle 5 into the reception space 100 in one direction. In particular the axle 5 engages with the first arm 30 of the locking element 10 to pivot the locking element 10 from the secured position to the release position, and then the axle 5 engages with the second arm 31 of the locking element 10 to pivot the locking element 10 from the release position to the secured position. Thus the simple interaction of the advancement of the axle 5 and the pivoting of the locking element 10 controls the movement of the tooth 35 into and out of the axle groove 36. Therefore additional biasing components, such as coiled springs, are not required to assist movement of the tooth 35 into or out of the axle groove 36.

It is noted that the pivot axis A—A defined by the pivot extensions 32 about which the locking element 10 pivots is substantially perpendicular to the longitudinal axis of the reception space 100 of the main body portion 14. In addition, the pivot axis A—A is radially offset from the longitudinal axis of the reception space 100 of the main body portion 14.

When the locking element 10 is in the secured position (FIG. 7), retraction of the axle 5 will not result in pivoting of the locking element 10 from the secured position to the release position to move the tooth 35 upwardly out of the groove 36. The acute angle α defined between the tooth 35 and the first arm 30 ensures that pivoting of the locking element 10 from the secured position to the release position will be resisted upon retraction of the axle 5. In this manner the axle 5 is locked in position in the reception space 100 of the journal 6.

If it is desired to remove the axle 5 from the journal 6, for example to facilitate replacement of the wheel 1, a simple pointed tool such as a flat blade screwdriver 13 may be used to pierce the thin layer of plastic covering the accessway 12, and then may be inserted through the accessway 12 to engage with the second arm 31 of the locking element 10. By pushing on the second arm 31, the locking element 10 is pivoted from the secured position to the release position to move the tooth 35 upwardly out of the groove 36 (FIG. 8). The axle 5 may then be withdrawn from the reception space 100 of the journal 6.

By forming the journal 6 from the separate components of the main body portion 14 and the locking element 10, this results in a simple journal 6 which is relatively easy to manufacture. In addition the locking element 10 may conveniently be mounted to the separate main body portion 14 in a simple snap-fit arrangement.

In FIGS. 9 to 16 there is illustrated another journal 300 according to the invention, which is similar to the journal 6 of FIGS. 1 to 8, and similar elements in FIGS. 9 to 16 are assigned the same reference numerals.

Figure 9:
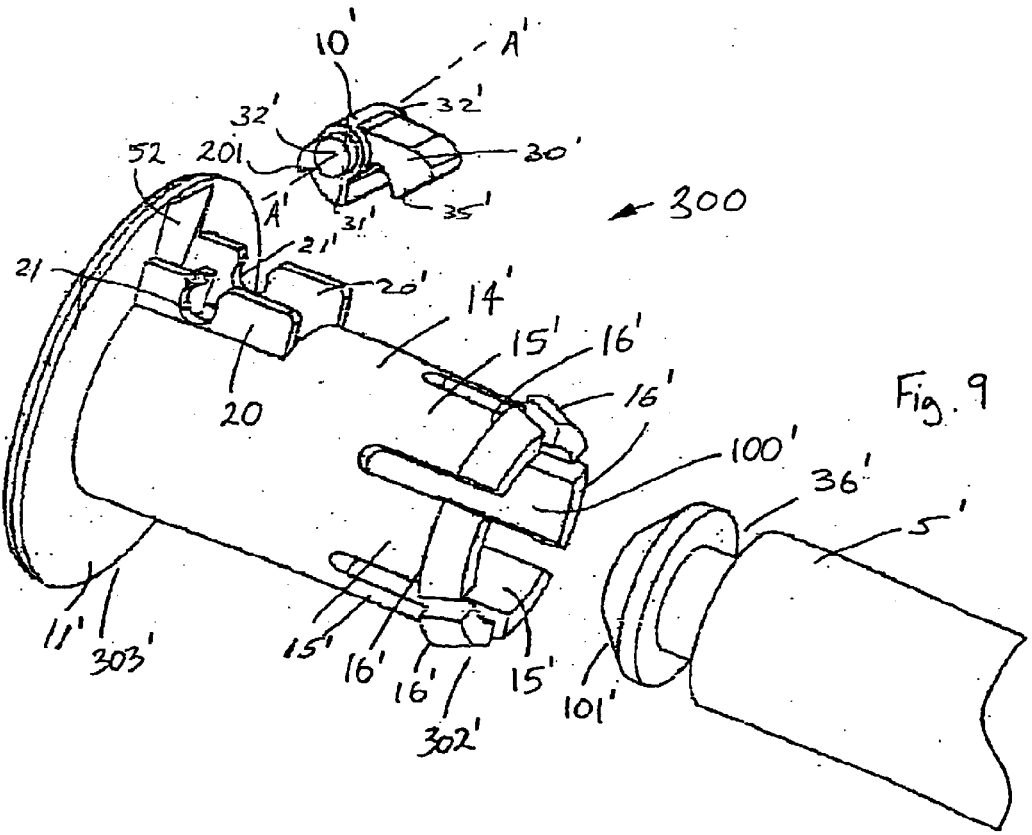
FIGS. 9 to 16 are views similar to FIGS. 2 to 8 of another journal according to the invention.
Figure 10:
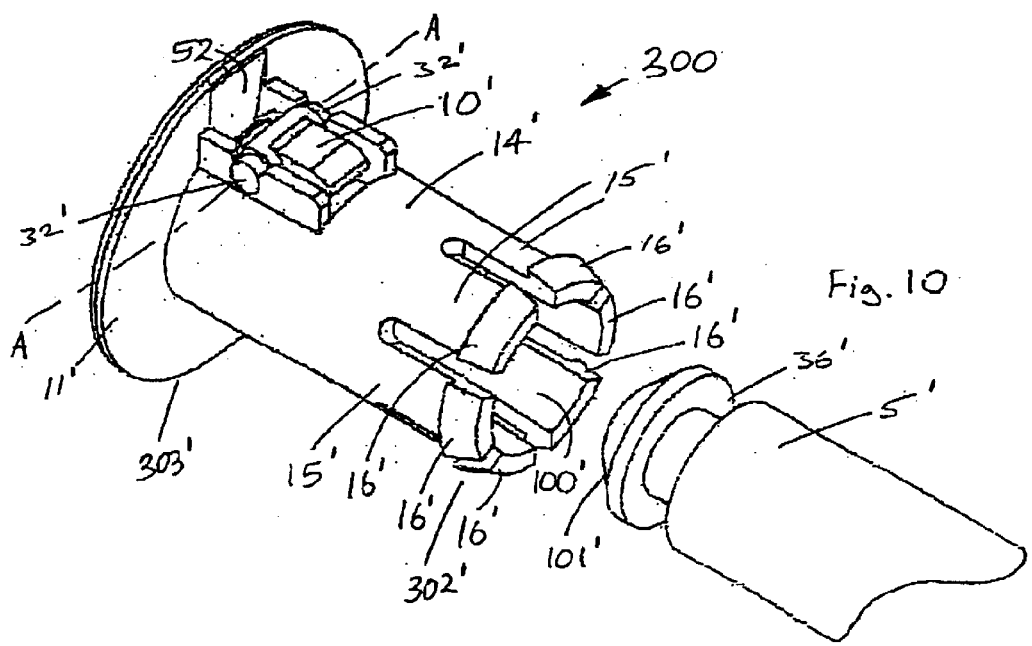
Figure 11:
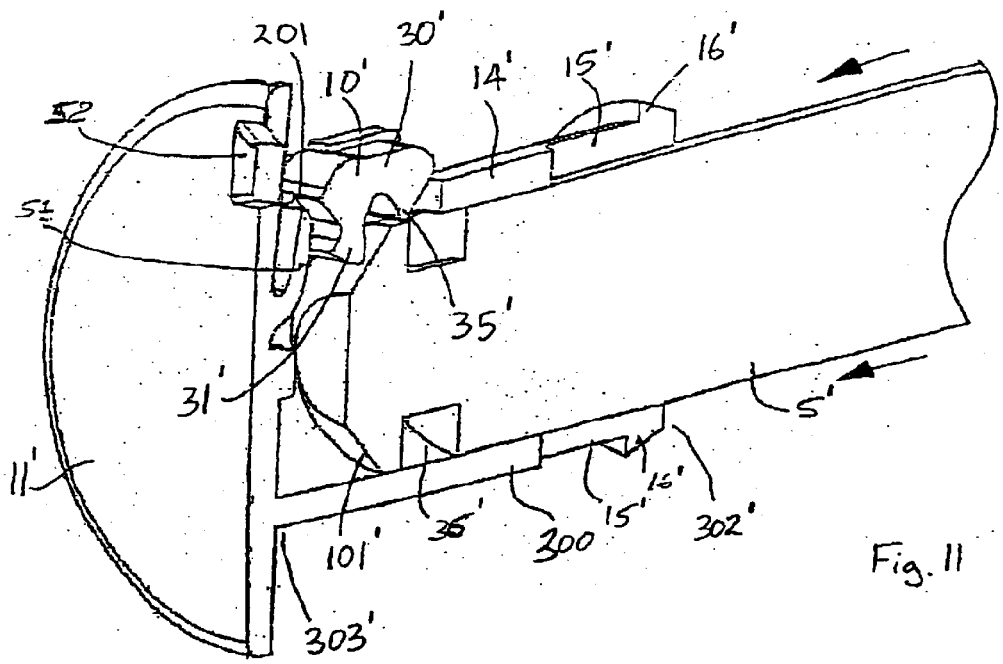

In this case the radially outwardly protruding lips 16' are formed at the innermost ends of each of the six cantilever arms 15' (FIGS. 9 and 10). The accessway 52 is defined through the outer cap 11' adjacent the two projecting ridges 20.

The locking element 10' has a downwardly facing tooth 201 formed in the second arm 31', and a spring latch arm 51 is integrally formed with the outer cap 11'. The latch arm 51 engages against the tooth 201 when the locking element 10' is in the secured position (FIGS. 12 and 14) to lock the locking element 10' in a latching manner in this secured position.

The journal 300 is assembled and the journal 300 is coupled to the wheel 1' in a manner similar to that described previously with the reference to FIGS. 1 to 8.

When the journal 300 is coupled to the wheel, the lips 16' engage with the annular shoulder 200' at six points spaced around the circumference of the shoulder 200'. This arrangement provides for a particularly secure coupling of the journal 300 to the wheel 1'.

The axle 5' is coupled to the journal 300 (FIGS. 11 and 12) in a manner similar to that described previously with reference to FIGS. 1 to 8.

Figure 12:
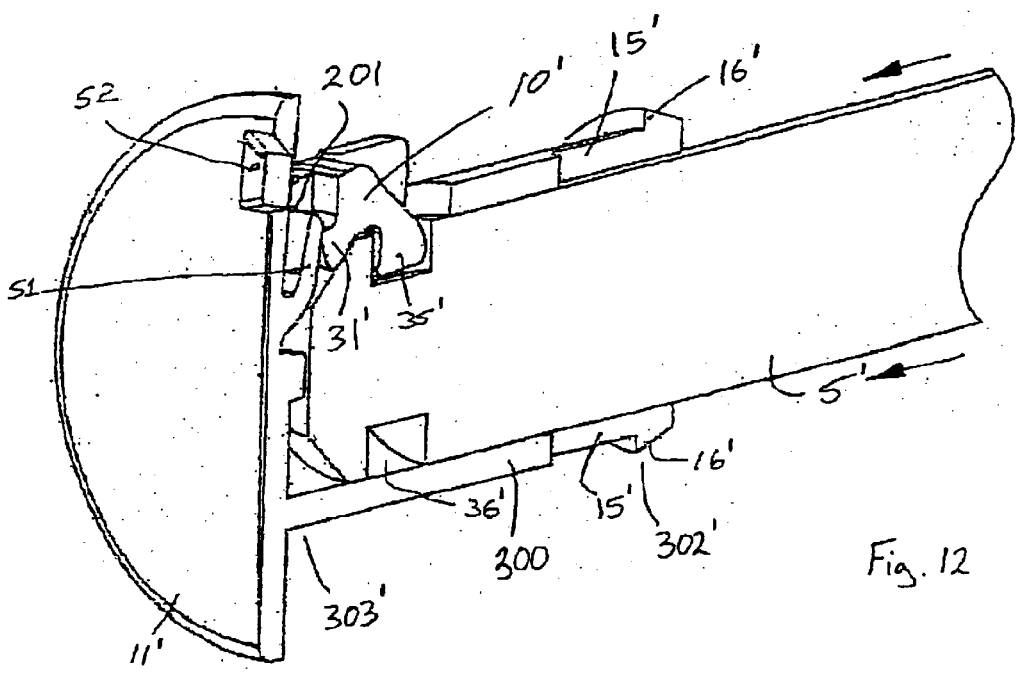
Figure 13:
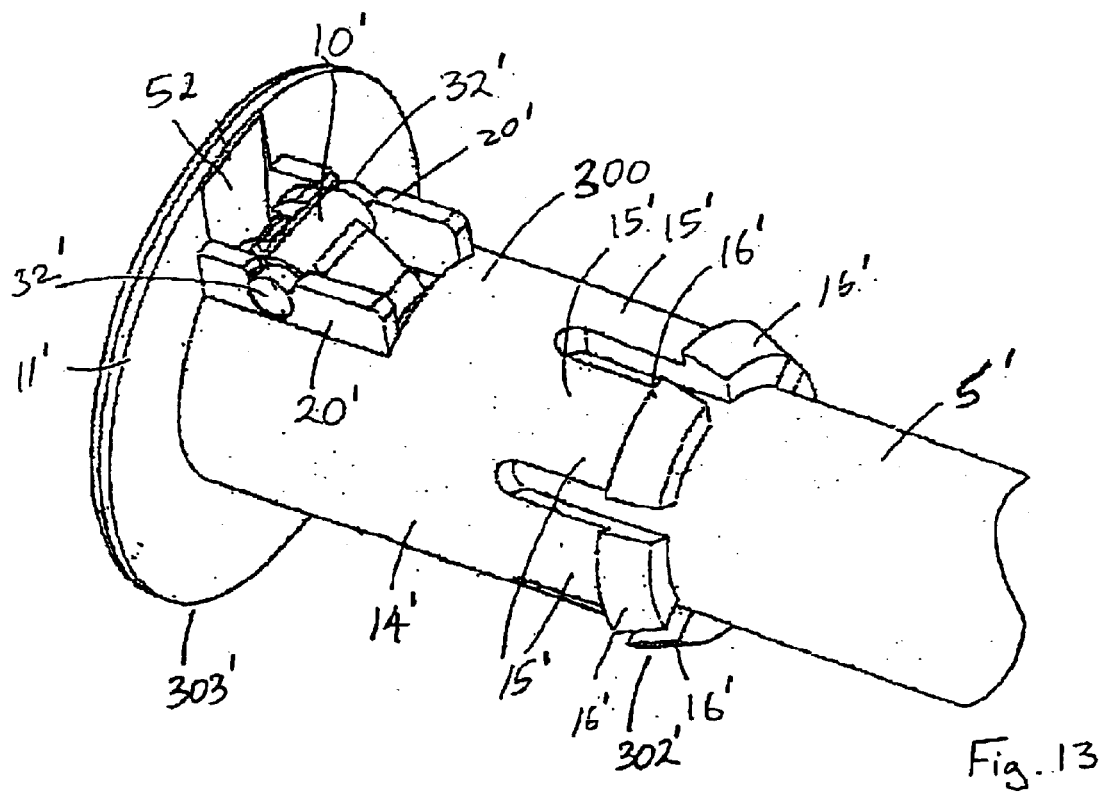
Figure 14:
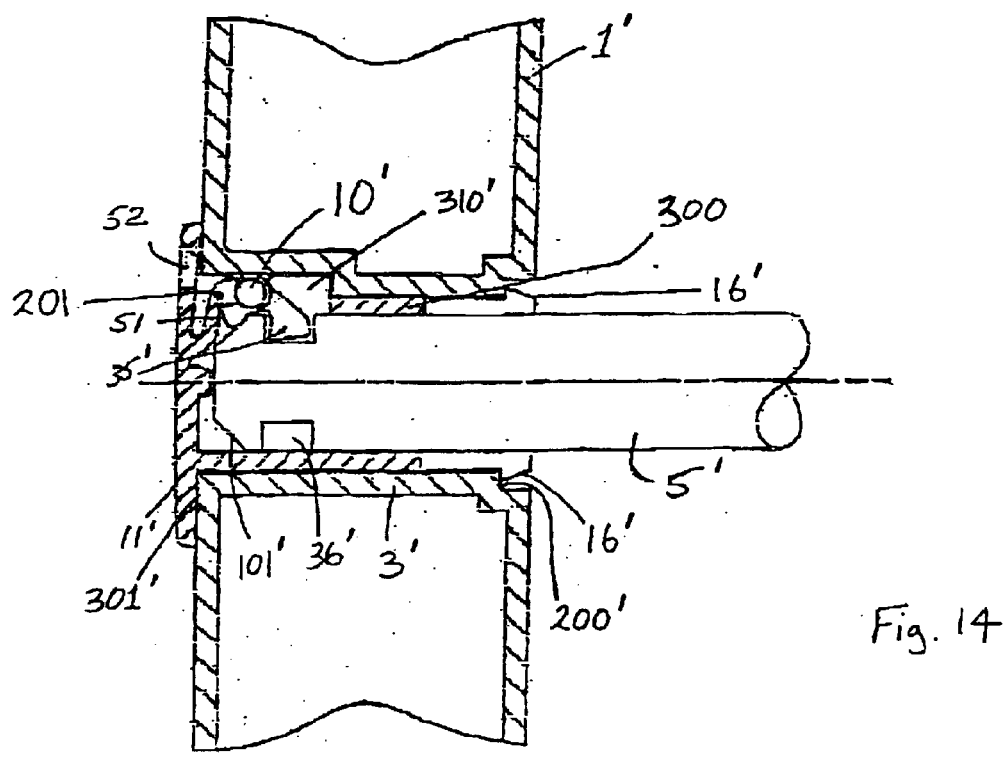

When the locking element 10' has been pivoted from the release position to the secured position and the tooth 35' has been moved downwardly into the groove 36', the latch arm 51 moves towards the locking element 10' under the natural biasing action of the latch arm 51 to engage against the tooth 201 in a latching manner. With the latch arm 51 in this position the locking element 10' is locked in the secured position with the tooth 35' engaged within the groove 36', as illustrated in FIGS. 12. and 14.

Figure 15:
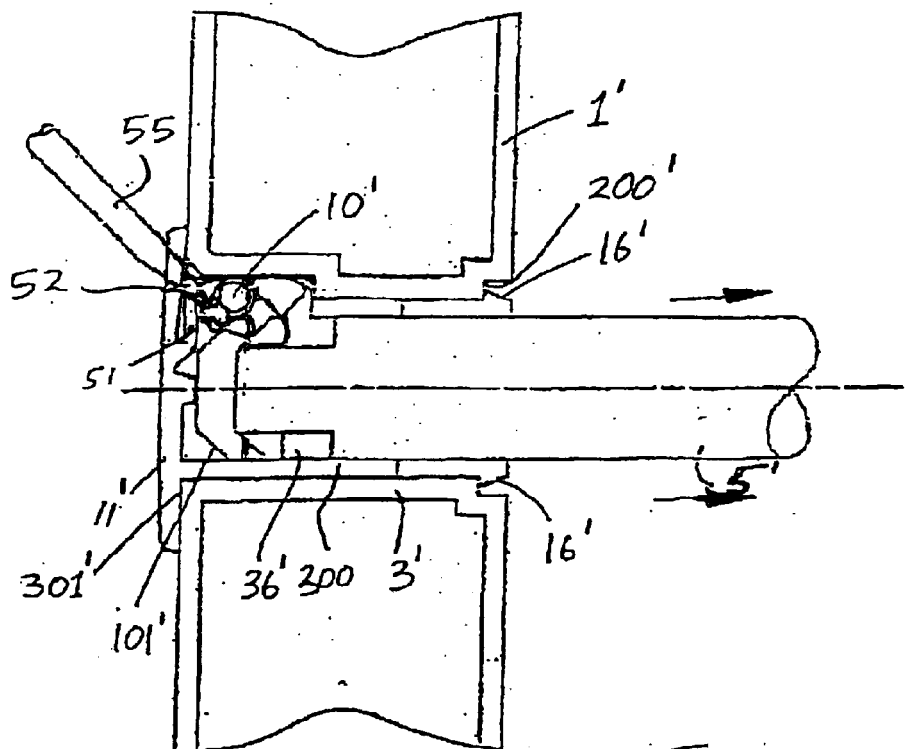
Figure 16:
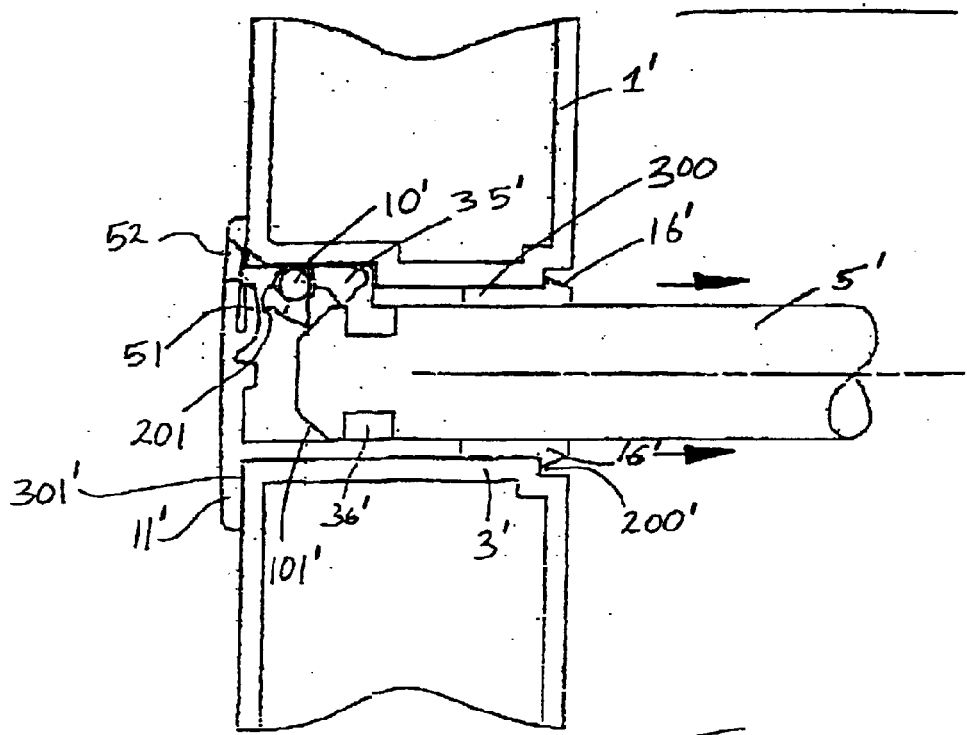

If it is desired to remove the axle 5' from the journal 300, a flat blade screwdriver 55 is used to pierce the thin layer of plastic covering the accessway 52, and then inserted through the accessway 52 to engage the latch arm 51. The latch arm 51 is moved away from the tooth 201 by levering the screwdriver 55. With the latch arm 51 in this position, the locking element 10' is movable again. The screwdriver 55 may then be pushed down against the second arm 31' to pivot the locking element 10' from the secured position to the release position moving the tooth 35' upwardly out of the groove 36' (FIG. 15). The axle 5' may then be withdrawn from the journal 200' (FIG. 16).

The locking element 10' may be of or contain a metal which may be sintered. The main body portion 14' of the journal may be moulded plastic material.

Thus, the invention provides a wheel with an axle retaining system that is of relatively simple construction. The retaining system is easy to assemble to an axle.

The invention is not limited to the embodiments hereinbefore described, with reference to the accompanying drawings, which may be varied in construction and detail.

What is claimed is:

1. A journal for coupling a wheel to an axle, the journal being configured to be mounted in a bore of the wheel, the journal defining a reception space for recieving the axle, the reception space defining an insertion end through which the axle may enter the reception space, the journal comprising:
   a locking element;
   the locking element defining a pivot axis and a securement region;
   the locking element being pivotable about the pivot axis between a release position in which the axle is removable from the reception space and a secured position in which the locking element is secured to the axle at the securement region to secure the axle in position in the reception space,
   a lock to lock the locking element in the secured position.

2. The journal as claimed in claim 1, wherein the pivot axis is located on the opposite side of the securement region to the insertion end.

3. The journal as claimed in claim 1, wherein the locking element comprises a first arm engagable with the axle upon advancement of the axle through the reception space to pivot the locking element from the secured position to the release position.

4. The journal as claimed in claim 3, wherein the first arm is locatable in the secured position in a recess of the axle to secure the axle in position in the reception space.

5. The journal as claimed in claim 3, wherein the first arm is shaped to resist pivoting of the locking element from the secured position to the release position upon retraction of the axle through the reception space.

6. The journal as claimed in claim 5, wherein the first arm comprises a pawl.

7. The journal as claimed in claim 1, wherein the locking element comprises a second arm engagable with the axle upon advancement of the axle through the reception space to pivot the locking element from the release position to the secured position.

8. The journal as claimed in claim 7, wherein the pivot is is located at the junction of the first arm and the second arm.

9. The journal as claimed in claim 7, wherein the first arm is substantially perpendicular to the second arm.

10. The journal as claimed in claim 1, wherein the lock comprises one or more protruding formations on the locking element for engagement against one or more co-operating surfaces on the journal to lock the locking element in the secured position.

11. The journal as claimed in claim 10, wherein the one or more protruding surfaces on the journal are provided on a latch arm.

12. The journal as claimed in claim 11, wherein the latch arm is movable between a release position in which the locking element is movable and a locking position in which the locking element is locked in the secured position.

13. The journal as claimed in claim 12, wherein the latch arm is biased towards the locking position.

14. The journal as claimed in claim 12, wherein in the locking position the latch arm engages the locking element.

15. The journal as claimed in claim 14, wherein the one or more protruding formations are provided by one or more tooth formations on the locking element against which the latch arm engages in the locking position.

16. The journal as claimed in claim 1, wherein the journal comprises a main body portion, the locking element being separate from the main body portion.

17. The journal as claimed in claim 16, wherein the locking element is mounted to the main body portion.

18. The journal as claimed in claim 17, wherein the locking element comprises a pivot extension for location in a co-operating pivot receiver of the main body portion.

19. The journal as claimed in claim 18, wherein the locking element comprises a pair of oppositely directed pivot extensions for location in a pair of co-operating pivot receivers of the main body portion.

20. The journal as claimed in claim 18, wherein the pivot extension is locatable in the pivot receiver in a snap-fit manner.

21. The journal as claimed in claim 1, wherein the journal is secured in position in the bore of the wheel.

22. The journal as claimed in claim 21, wherein the journal includes a lip engagable with a shoulder defined on the wheel.

23. The journal as claimed in claim 22, wherein the lip is engagable with the shoulder defined by an open mouth of the bore.

24. The journal as claimed in claim 22, wherein the lip is engagable with the shoulder defined within the bore.

25. The journal as claimed in claim 22, wherein the lip is engagable with the shoulder which extends circumferentially around the bore.

26. The journal as claimed in claim 22, wherein the journal comprises a lip at each end of the journal.

27. The journal as claimed in claim 22, wherein the lip is movable between a release position in which the journal is removable from the bore and a secured position in which the journal is secured in position in the bore.

28. The journal as claimed in claim 27, wherein the lip is biased towards the secured position.

29. The journal as claimed in claim 22, wherein the lip is provided in the form of at least one protrusion at an end of at least one cantilever arm.

30. The journal as claimed in claim 29, wherein a plurality of protrusions are provided spaced around the circumference of the journal.

31. The journal as claimed in claim 1, wherein the journal comprises an accessway through which access may be gained to one or more movable part of the journal.

32. The journal as claimed in claim 1, wherein the pivot axis is substantially perpendicular to a longitudinal axis of the reception space.

33. The journal for coupling a wheel to an axle, the journal being configured to be mounted in a bore of the wheel, the journal having a reception space for receiving the axle, the journal comprising:
   a main body portion and a separate locking element;
   the locking element being pivotable relative to the main body portion between a release position in which the axle is removable from the reception space and a secured position in which the axle is secured in position in the reception space.

34. The wheel assembly comprising:
   a wheel, and a journal for coupling the wheel to an axle;
   the journal being configured to be mounted in a bore of the wheel;
   the journal defining a reception space for receiving the axle;
   the reception space defining an insertion end through which the axle may enter the reception space;
   the journal comprising a locking element;
   the locking element defining a pivot axis and a securement region;
   the locking element being pivotable about the pivot axis between a release position in which the axle is removable from the reception space and a secured position in which the locking element is secured to the axle at the securement region to secure the axle in position in the reception space,
   a lock to lock the locking element to the secured position.

35. The wheel assembly as claimed in claim 34, wherein the wheel has an outer rim and an inner hub with a central bore.

36. The wheel assembly as claimed in claim 34, wherein the wheel is of molded plastic.

37. A wheel having an outer rim and an inner hub with a central bore, the wheel comprising:
   an engagement surface in the bore, the engagement surface extending circumferentially around the bore for engagement with at least a securing part of a journal to secure the journal in the bore;
   the journal defining a reception space for receiving an axle;
   the reception space defining an insertion end through which the axle may enter the reception space; and
   the securing part being located substantially at the insertion end;
   the engagement surface being provided by a radially inwardly protruding shoulder.

38. An axle assembly comprising:
   an axle, and a journal for coupling the axle to a wheel;
   the journal being configured to be mounted in a bore of the wheel;
   the journal defining a reception space for receiving the axle;
   the reception space defining an insertion end through which the axle may enter the reception space;
   the journal comprising a locking element;
   the locking element defining a pivot axis and a securement region;
   the locking element being pivotable about the pivot axis between a release position in which the axle is removable from the reception space and a secured position in which the locking element is secured to the axle at the securement region to secure the axle in position in the reception space; and
   a lock to lock the locking element in the secured position.

39. The axle assembly as claimed in claim 38, wherein he axle comprises a recess for receiving the locking element in the secured position.

40. The axle assembly as claimed in claim 39, wherein the recess comprises a groove in an outer surface of the axle.

41. The axle assembly as claimed in claim 40, wherein the groove extends radially inwardly of the outer surface.

42. The axle assembly as claimed in claim 40, wherein the groove extends circumferentially around the axle.

43. The axle assembly as claimed in claim 38, wherein a leading end of the axle has a chamfered edge.

44. An assembly comprising:
   a wheel, an axle, and a journal for coupling the wheel to the axle;
   the journal being configured to be mounted in a bore of the wheel;
   the journal defining a reception space for receiving the axle;
   the reception space defining an insertion end through which the axle may enter the reception space,
   the journal comprising a locking element;
   the locking element defining a pivot axis and a securement region;
   the locking element being pivotable about the pivot axis between a release position in which the axle is removable from the reception space and a secured position in which the locking element is secured to the axle at the securement region to secure the axle in position in the reception space; and
   a lock to lock the locking element in the secured position.

45. A bin or trash cart comprising:
   an assembly of a wheel, an axle, and a journal for coupling the wheel to the axle;
   the journal being configured to be mounted in a bore of the wheel;
   the journal defining a reception space for receiving the axle;
   the reception space defining an insertion end through which the axle may enter the reception space,
   the journal comprising a locking element;
   the locking element defining a pivot axis and a securement region;
   the locking element being pivotable about the pivot axis between a release position in which the axle is removable from the reception space and a secured position in which the locking element is secured to the axle at the securement region to secure the axle in position in the reception space; and
   a lock to lock the locking element in the secured position.

* * * * *